(12) United States Patent
Shimizu et al.

(10) Patent No.: US 8,358,891 B2
(45) Date of Patent: Jan. 22, 2013

(54) WAVEGUIDE TYPE OPTICAL DEVICE

(75) Inventors: Takanori Shimizu, Tokyo (JP);
Masafumi Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 12/747,953

(22) PCT Filed: Nov. 20, 2008

(86) PCT No.: PCT/JP2008/071134
§ 371 (c)(1),
(2), (4) Date: Jun. 14, 2010

(87) PCT Pub. No.: WO2009/078248
PCT Pub. Date: Jun. 25, 2009

(65) Prior Publication Data
US 2010/0260461 A1 Oct. 14, 2010

(30) Foreign Application Priority Data

Dec. 14, 2007 (JP) ................................. 2007-323330

(51) Int. Cl.
*G02B 6/26* (2006.01)
*G02B 6/10* (2006.01)

(52) U.S. Cl. .......................................... 385/40; 385/129
(58) Field of Classification Search ........................ None
See application file for complete search history.

(56) References Cited

U.S. PATENT DOCUMENTS 5,155,620 A * 10/1992 Gordon et al. ................ 359/328

FOREIGN PATENT DOCUMENTS

| JP | 7-120795 A | 5/1995 |
| JP | 7-191352 A | 7/1995 |
| JP | 2540964 B | 7/1996 |
| JP | 2005055774 A | 3/2005 |
| JP | 2007093634 A | 4/2007 |
| JP | 2007212787 A | 8/2007 |

OTHER PUBLICATIONS

G.H. Jin et al., "PLZT Film Waveguide Mach-Zehnder Electrooptic Modulator", Journal of Lightwave Technology, vol. 18, No. 6, Jun. 2000, pp. 807-812.
S.P. Pogossian et al., "The Single-Mode Condition for Semiconductor Rib Waveguide with Large Cross Section", Journal of Lightwave Technology, vol. 16, No. 10, Oct. 1998, p. 1851-1853.
T. Shimizu et al., "Device Design and Optical Waveguide Characteristics of PLZT Electro-Optic Modulators Using Aerosol Deposition for On-Chip Optical Interconnections", Electronics letters, IEICE Electronics Society Conference, Sep. 2007, pp. 181.

* cited by examiner

*Primary Examiner* — Jerry Rahll

(57) ABSTRACT

There is provided a waveguide type optical device whose parasitic capacitance is reduced to allow an increase in signal transmission speed. Bottom electrode 41 is formed on substrate 2, bottom cladding 51 is formed on bottom electrode 41, and bottom core 62 is formed on bottom cladding 51. Top core 61 is formed on bottom core 62, top cladding 53 is formed on top core 61, and top electrode 42 is formed on top cladding 53. Two sides of top core 61 and bottom core 62 are covered with side cladding layer 52. Vertically overlapping portions of top electrode 42 and bottom electrode 41 are located almost at a same place as a region for a core layer composed of top core 61 and bottom core 62. The width of one from among top core 61 and bottom core 62 is satisfying a single mode condition, and the width of the other is almost equal to or more than the width of a field distribution.

9 Claims, 6 Drawing Sheets

WAVEGUIDE TYPE OPTICAL DEVICE

TECHNICAL FIELD

The present invention relates to a waveguide type optical device used for optical interconnection and optical communication and, more particularly, to a waveguide type optical device using the electrooptic effect.

BACKGROUND ART

Optical modulators, optical switches, and others are used in optical communication represented by, e.g., high-capacity transmission in a metropolitan area network and an intercontinental or intracontinental backbone network and optical interconnection applied to servers and routers, and the like. Of the optical devices, small and high-speed ones are needed in terms of data formation and signal processing. As one of optical devices meeting the needs, a waveguide type optical device using the electrooptic effect has been developed in recent years. See, e.g., JP2007-212787A.

As a waveguide type optical device related to the present application, a Mach-Zehnder optical modulator which is composed of a reversed-ridge waveguide obtained by stacking layers of lanthanum-doped lead zirconate titanate (PLZT) on indium tin oxide (ITO) patterned on a sapphire substrate is disclosed in Document 1 below.

Document 1: "JOURNAL OF LIGHTWAVE TECHNOLOGY", VOL. 18, NO. 6, JUNE 2000, pp. 807-812 (see, in particular, FIGS. 1, 3, and 8)

A light beam in the optical modulator is guided through a PLZT portion without ITO and is branched into two parallel waveguides through a Y branching waveguide, and light beams propagate through the two parallel waveguides. Next, the light beams are multiplexed by the other Y branching waveguide, and the multiplexed light beam propagates through one waveguide. In such an optical modulator, an electrode is formed in each of an inner area between two parallel waveguides and two outer areas between which the two waveguides are sandwiched. To operate the modulator, a voltage of 0 V is applied to the electrode in the inner area, a voltage of (Vb+Vm) is applied to the electrode in one of the outer areas, and a voltage of (Vb−Vm) is applied to the electrode in the other outer area.

However, in each ridge waveguide illustrated in Document 1, a core layer is made of PLZT with a high dielectric constant, a top core of the core layer is formed over the entire surface of the device with respect to a bottom core of the core layer which transmits light. In the case of such a core structure, a pair of top and bottom electrodes formed to sandwich the whole region of a top core increases parasitic capacitance. In order to prevent an increase in parasitic capacitance, the core was a structure in which electrodes are positioned above the waveguide so that the waveguide is horizontally sandwiched between the electrodes to apply a voltage, therefore the structure makes it difficult to apply an efficient electric field to the waveguides and their surroundings.

As described above, in a waveguide type optical device using the ridge waveguide described in Document 1, a core material with a high dielectric constant is formed over the entire surface of the device. If electrodes are vertically formed to sandwich cores, parasitic capacitance cannot be reduced. Accordingly, the waveguide type optical device suffers from the problem of the difficulty in achieving a higher signal transmission speed.

Additionally, the electrodes are formed above the waveguides away from a core layer, as described above. An efficient electric field cannot be applied to a waveguide section, thus resulting in the problem in which it is difficult to achieve a lower voltage or lower power.

DISCLOSURE OF THE INVENTION

An object of the present invention is to provide a waveguide type optical device capable of solving at least one of the above-described problems. An example of the object is to provide a waveguide type optical device whose parasitic capacitance is reduced to allow an increase in signal transmission speed. Another example of the object of the present application is to provide a waveguide type optical device which can apply an efficient electric field and Facilitates a reduction in voltage or power.

One aspect of the present invention is a waveguide type optical device including a structure in which a first electrode, a first cladding, a first core, a second core, a second cladding, and a second electrode are formed on a substrate in this order. Side surfaces of a core layer composed of the first core and the second core are covered with a side cladding layer. In particular, a width of one core from among the first core and the second core is satisfying a single mode condition, and a width of the other core is almost equal to or more than a width of a field distribution of light. A region for the core layer is sandwiched between the vertically overlapping portions of the first electrode and the second electrode.

This aspect reduces parasitic capacitance and can facilitate an increase in signal transmission speed. The aspect can also apply efficiently an electric field and can facilitate a reduction in power.

BRIEF DESCRIPTION OF THE DRAWINGS

FIG. 2 are charts showing a mode distribution of propagating light near a core of the waveguide type optical device according to the first exemplary embodiment, in which FIG. 2(a) is a chart showing an optical field pattern when light propagates through a waveguide of the waveguide type optical device, and FIG. 2(b) is a chart showing a light intensity distribution when light propagates through the waveguide in an optical axis direction of the waveguide type optical device;

FIG. 4 are structural views showing a waveguide type optical device according to a second exemplary embodiment, in which FIG. 4(a) is a plan view of the waveguide type optical device, and FIG. 4(b) is a cross-sectional view taken along the line A-A';

FIG. 6 are structural views showing a waveguide type optical device according to a third exemplary embodiment, in which FIG. 6(a) is a plan view of the waveguide type optical device, and FIG. 6(b) is a cross-sectional view taken along the line A-A'.

BEST MODE FOR CARRYING OUT THE INVENTION (First Embodiment)

Figure 1:
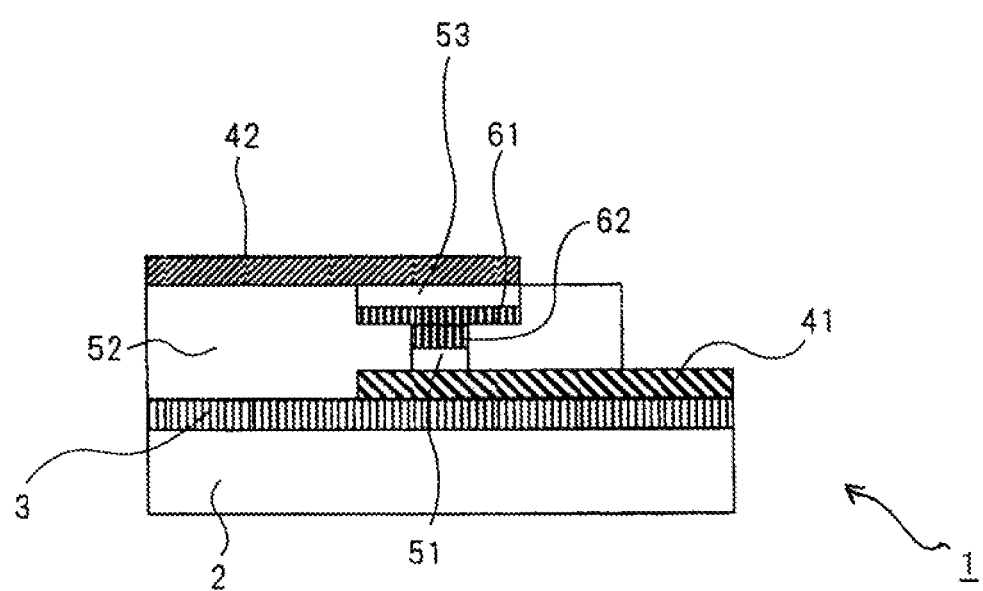
FIG. 1 is a schematic view of a waveguide type optical device according to a first exemplary embodiment.

FIG. 1 is a cross-sectional view showing the structure of a waveguide type optical device according to a first exemplary embodiment in a cross-section through an optical waveguide. Waveguide type optical device 1 according to the exemplary embodiment shown in FIG. 1 has a structure in which insulating layer 3, bottom electrode 41 serving as a first electrode, bottom cladding 51 serving as a first cladding, bottom core 62 serving as a first core, top core 61 serving as a second core, top cladding 53 serving as a second cladding, and top electrode 42 serving as second electrode are stacked on substrate 2 in this order. Two sides of bottom cladding 51, bottom core 62, top core 61, and top cladding 53 are covered with side cladding layer 52.

A conductive Si substrate is often used as substrate 2. In this case, insulating layer 3 electrically isolates substrate 2 and bottom electrode 41 from each other. Alternatively, an Si substrate with high resistivity may be used as substrate 2. This case does not require insulating layer 3.

Bottom core 62 and top core 61 are each made of an electrooptic crystal material such as lithium niobate, lead zirconate titanate, or lanthanum-doped lead zirconate titanate. In contrast to the background art, where the top core is formed over the entire surface of the device, top core 61 according to the present invention functions as a part of a core layer of each optical waveguide which is divided by side cladding layer 52 and forms a reversed-ridge structure.

For the dimensions of the core layer, examples of a single mode condition for a ridge waveguide include the relation $t<r/(1-r)^{0.5}$, where t is the ratio of the width of a bottom core to the height of a core layer (the sum of the heights of the bottom core and a top core) and r is the ratio of the height of the top core to the height of the core layer, as described in Document 2 below.

Document; 2: "JOURNAL OF LIGHTWAVE TECHNOLOGY", VOL. 16, NO. 10, OCTOBER 1998, pp. 1851-1853

At the time of designing a device satisfying the relation, a field distribution of light is calculated by the BPM (Beam Propagation Method) or the like. The width of top core 61 may be set to be almost equal to or more than the width of the field distribution and be almost equal to or less than twice the width. The width of bottom core 62 only needs to satisfy the single mode condition.

The widths of top cladding 53 and bottom cladding 51 are equal to those of top core 61 and bottom core 62, respectively. Assume that a refractive index $n_1$ of top cladding 53 and bottom cladding 51 is lower than a refractive index $n_2$ of top core 61 and bottom core 62 ($n_1<n_2$). In this case, a dielectric constant $\epsilon_1$ of top cladding 53 and bottom cladding 51 is desirably a value close to a dielectric constant $\epsilon_2$ of top core 61 and bottom core 62.

A refractive index $n_3$ of side cladding layer 52 is desirably lower than the refractive index $n_1$ of top cladding 53 and bottom cladding 51 and the refractive index $n_2$ of top core 61 and bottom core 62 ($n_3<n_1$ and $n_3<n_2$). In this case, a dielectric constant $\epsilon_3$ of side cladding layer 52 is desirably lower than the dielectric constant $\epsilon_1$ of claddings 51 and 53 and the dielectric constant $\epsilon_2$ of cores 61 and 62 ($\epsilon_3<<\epsilon_1$ and $\epsilon_3<<\epsilon_2$). As the material for side cladding layer 52, an oxide film, polymer resin, or the like can be used.

Bottom electrode 41 is positioned at the bottoms of bottom cladding 51 and side cladding layer 52. Top electrode 42 is positioned at the tops of bottom cladding 53 and side cladding layer 52. Overlapping portions of bottom electrode 41 and top electrode 42, as seen from above waveguide type optical device 1 (i.e., in a direction perpendicular to a principal surface of substrate 2), are located almost at the same place as overlapping portions of bottom core 62 and top core 61. This configuration allows a reduction in parasitic capacitance in side cladding layer 52 and can apply efficiently an electric field to cores 61 and 62 constituting an optical waveguide and claddings 51 and 53 adjacent thereto from above and below.

The operation of the waveguide type optical device according to this exemplary embodiment will be described with reference to FIGS. 2 and 3.

FIG. 2(a) shows an optical field pattern when light propagates through a waveguide of waveguide type optical device 1 in FIG. 1. FIG. 2(b) shows a light intensity distribution when light propagates through the waveguide in an optical axis direction of waveguide type optical device 1. The beam propagation method is used to calculate the light intensity distribution. FIG. 3 is a graph of frequency characteristics of an S-parameter in electric wiring with the structure in FIG. 1.

Figure 2:
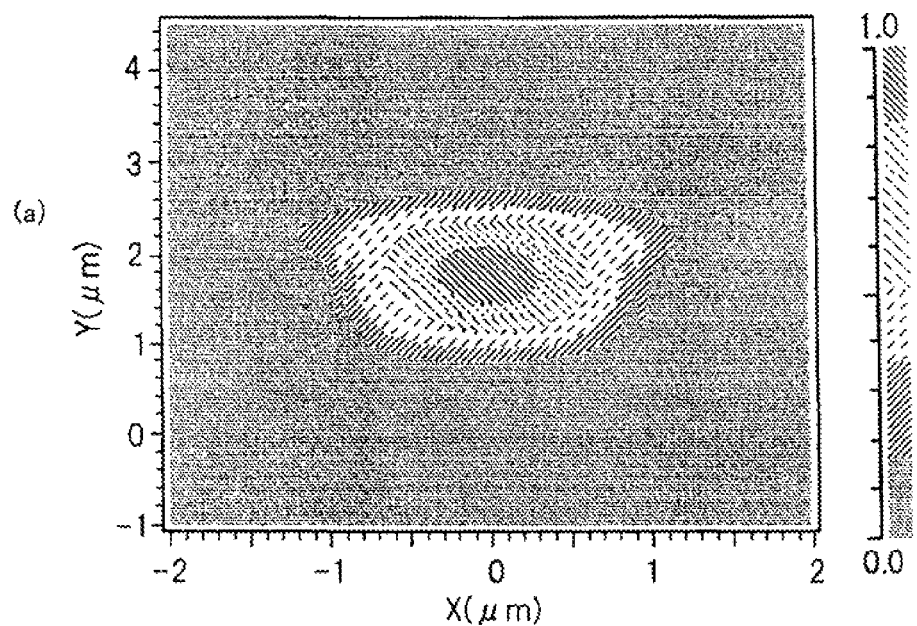
Figure 2:
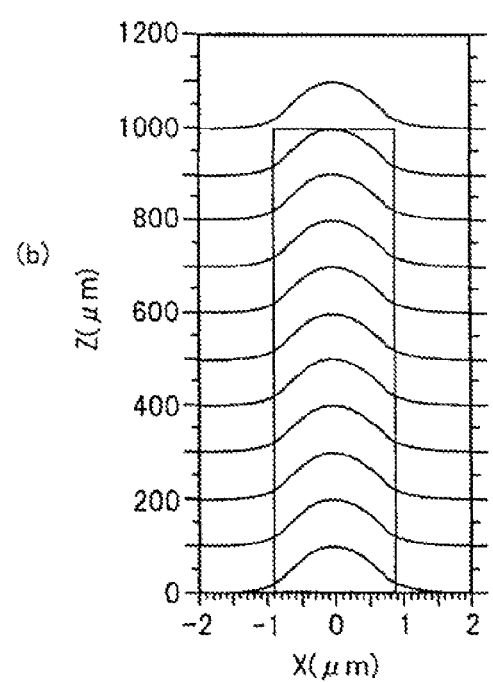
Figure 3:
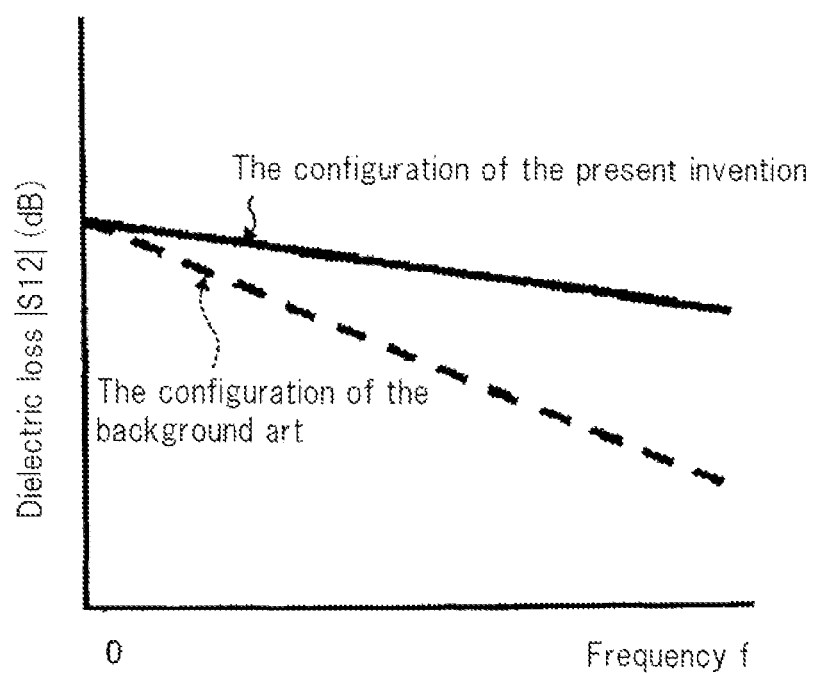
FIG. 3 is a graph showing frequency characteristics as dielectric loss in the waveguide type optical device according to the first exemplary embodiment.

If the light from the outside is injected into waveguide type optical device 1, the light propagates through the waveguide, as in FIG. 2. At this time an optical field is formed at a core layer and its surroundings. When a DC voltage is applied across top electrode 42 and bottom electrode 41 while the light is propagating, the effective refractive index changes, and the optical length changes. When a voltage modulated at high speed is superimposed on the DC voltage, the effective refractive index changes accordingly. The configuration of this exemplary embodiment can reduce electrically dielectric loss between top electrode 42 and bottom electrode 41 in a higher frequency range, compared to the background art, as shown in FIG. 3.

(Second Embodiment)

Figure 4:
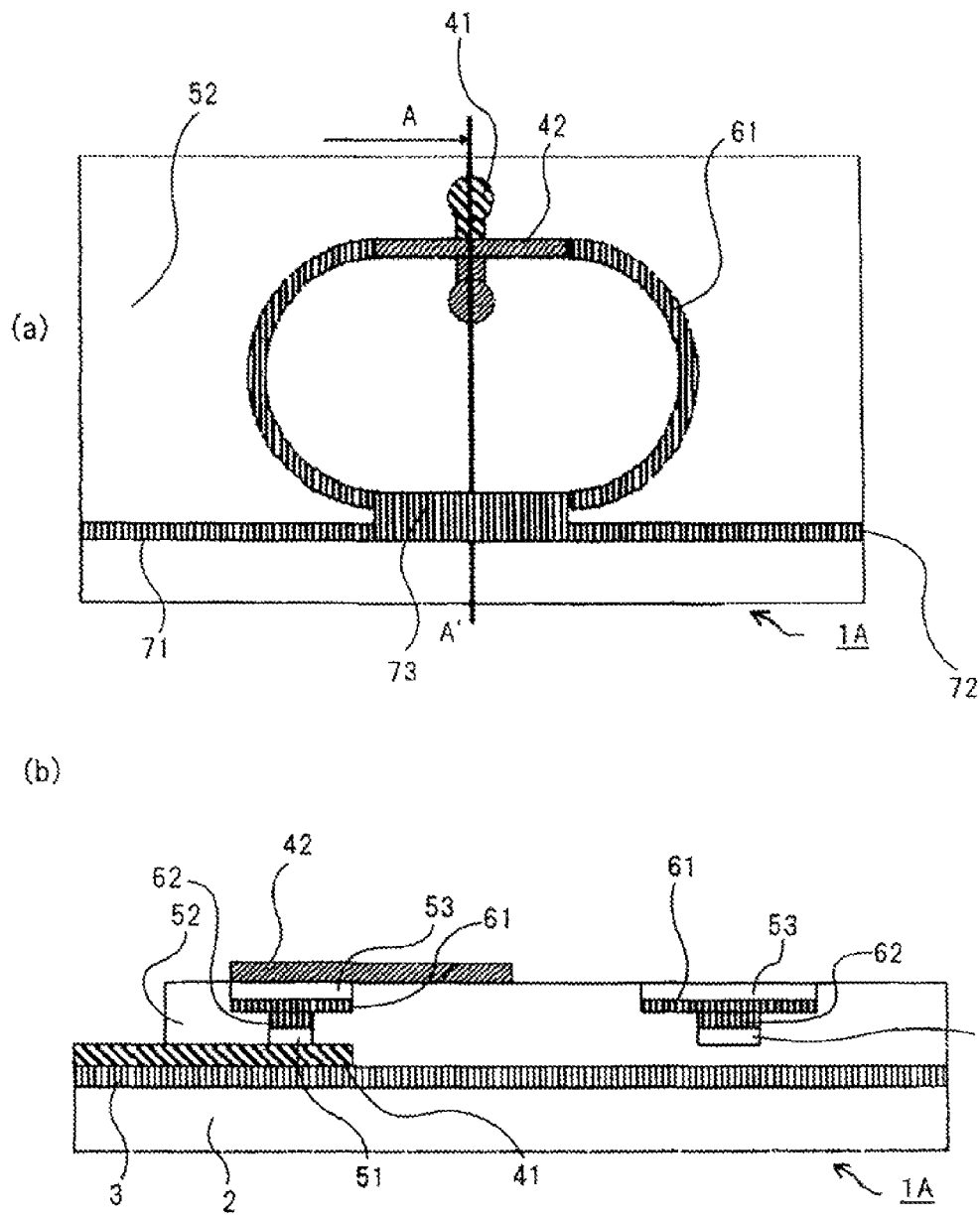

FIG. 4 are structural views showing a waveguide type optical device according to a second exemplary embodiment. FIG. 4(a) is a plan view of waveguide type optical device 1A serving as a ring resonator-based modulator, and FIG. 4(b) is a cross-sectional view of FIG. 4(a) taken along the line A-A', as seen in the direction of the arrow. Waveguide type optical device 1A has a structure in which input port 71 and output port 72 are coupled to a racetrack-shaped ring resonator with a multimode interference type optical coupler (MMI optical coupler) 73.

An region for an extraction electrode connected to voltage sources (not shown) is as small as possible in order to minimize parasitic capacitance between bottom electrode 41 and top electrode 42. The cross-sectional structure of this device on the side where electrodes 41 and 42 are positioned is similar to the structure in FIG. 1, as shown in FIG. 4(b). On the side without electrodes 41 and 42, the optical waveguide structure of MMI optical coupler 73 consists of top core 61, bottom core 62, bottom cladding 51, and top cladding 53. Note that a directional coupler may be used instead of MMI optical coupler 73.

Figure 5:
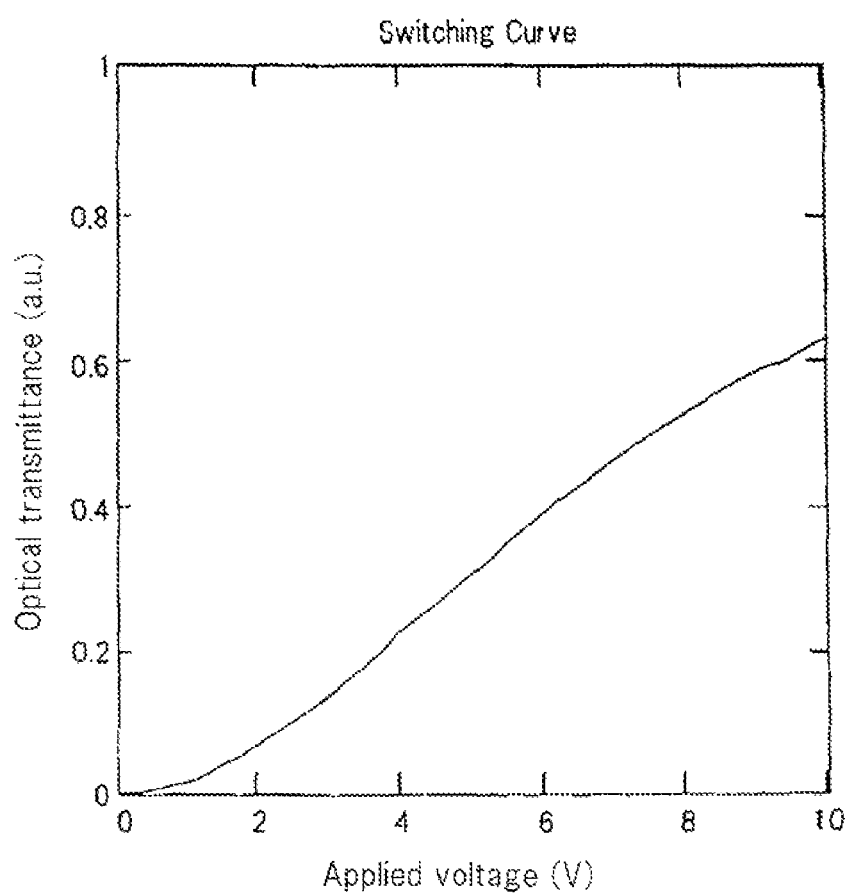
FIG. 5 is a graph for explaining the operation of the waveguide type optical device according to the second exemplary embodiment.

Assume that the ring radius is 100 μm and that the MMI waveguide length is 70 μm, in waveguide type optical device 1A in FIG. 4. If a voltage is applied across bottom electrode 41 and top electrode 42, as shown in FIG. 5, optical transmittance between input port 71 of waveguide type optical device 1A and output port 72 changes. When 0 V was applied to bottom electrode 41, and a bias voltage of 3.5 V and an amplitude voltage of 3V were applied to top electrode 42, the extinction ratio was 7 dB. Note that the extinction ratio refers to the ratio between a light intensity when an optical modulator is ON and that when the optical modulator is OFF.

(Third Embodiment)

Figure 6:
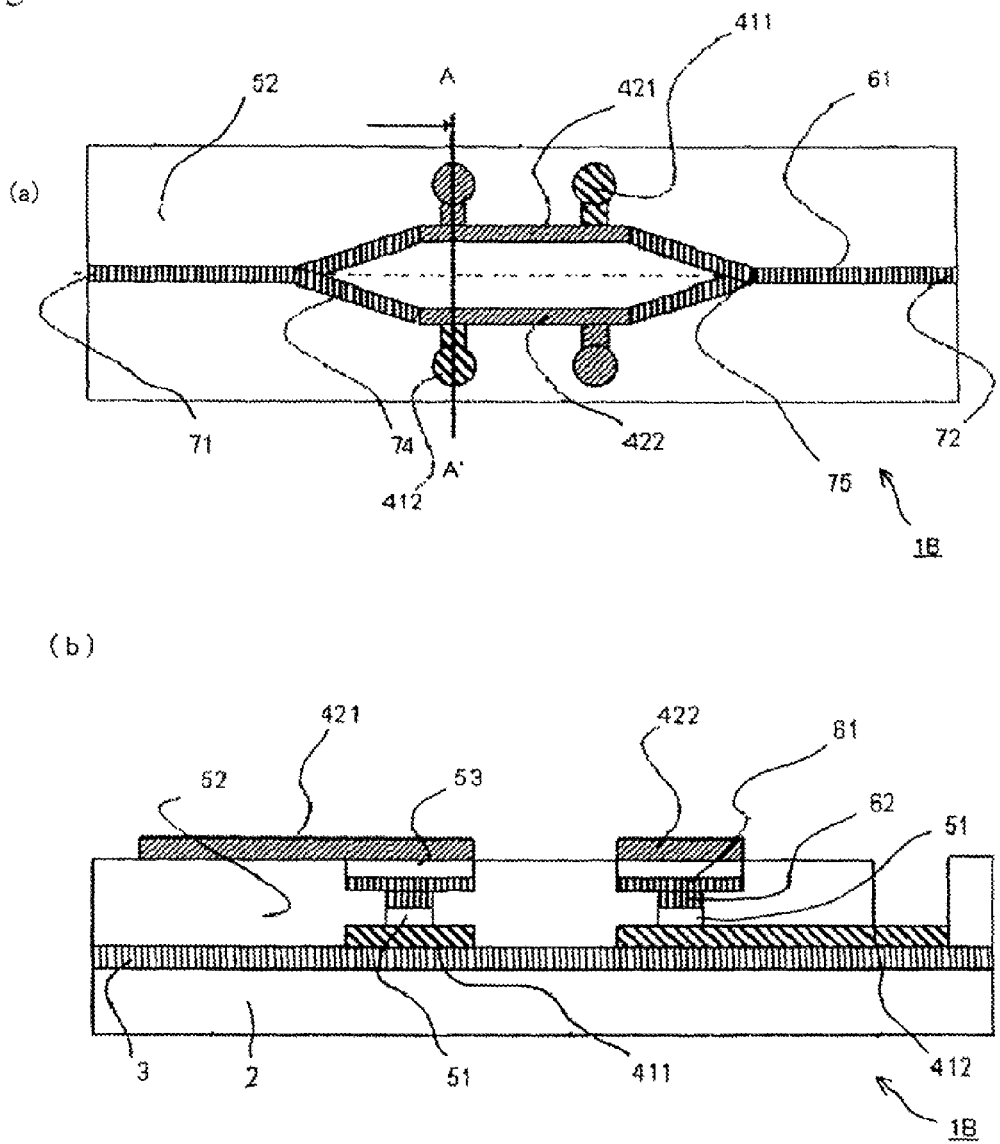

FIG. 6 are structural views showing a waveguide type optical device according to a third exemplary embodiment. FIG. 6(a) is a plan view of waveguide type optical device 1B as a Mach-Zehnder modulator, and FIG. 6(b) is a cross-sectional view of FIG. 6(a) taken along the line A-A', as seen from the arrow. Waveguide type optical device 1B is structured such that Y branching waveguides 74 and 75 are coupled to two ends of two parallel waveguides and such that ends of Y branching waveguides 74 and 75 on the opposite side of the parallel waveguides serve as input port 71 and output port 72, respectively.

As shown in FIG. 6(b), the cross-section structure of each waveguide is similar to that in FIG. 1. The widths of bottom electrode 411 and top electrode 422 are comparable to the width of a core layer.

The manner of operation of this modulator is as in Non-Patent Document 1. That is, a light beam is injected into the modulator through input port 71 and is branched into two parallel waveguides through Y branching waveguide 74, and light beams propagate through the two parallel waveguides. Next, the light beams are multiplexed by Y branching waveguide 75 on the other side, and the multiplexed light beam is outputted through output port 72. To operate the modulator, a voltage (Vb+Vm) obtained by adding an amplitude voltage Vm to a bias voltage Vb is applied to top electrode 421 of one of the waveguides, and a voltage (Vb−Vm) is applied to top electrode 422 of the other waveguide, and a voltage of 0 V is applied to bottom electrodes 411 and 412.

Note that a voltage may be applied only to one of the two parallel waveguides and that the waveguide type optical device may be operated with an electrode placed only at one of the waveguides. Alternatively, a directional coupler and an MMI optical coupler may be used instead of the Y branching waveguides.

As has been described in the context of the exemplary embodiments, in a waveguide type optical device according to the present invention, a ridge core layer (61 and 62) is formed at a part so as not to change the field distribution. This configuration has the effect of reducing parasitic capacitance in an extraction electrode and facilitating an increase in signal transmission speed.

Overlapping portions of the top electrode (42) and the bottom electrode (41) are located only within a region of the divided ridge core layer, thereby being capable to apply vertically an electric field to an optical waveguide and its surroundings. This has the effect of applying of an electric field, that is, the effect of facilitating a reduction in power.

The waveguide type optical devices according to the present invention illustrated above are applied to optical wiring in an LSI chip, to optical interconnection between chips, and to optical communication.

Note that although the exemplary embodiments have been described with reference to the drawings, the present invention is not limited to the illustrated structures and shapes, and the above-described exemplary embodiments can be appropriately changed and implemented in the range of the technical idea of the present invention. For example, an optical device using a reversed-ridge waveguide is illustrated in each of the exemplary embodiments, the shape of a core layer is not limited to a reversed-ridge shape. That is, for the widths of top core 61 and bottom core 62, one of the widths needs to satisfy the single mode condition for a waveguide, and the other needs to be almost equal to or more than the width of the field distribution of light.

A bottom cladding or a top cladding can be expanded within a design allowance corresponding to a portion of a top electrode or a bottom electrode which does not overlap vertically with the bottom electrode or the top electrode. Overlapping portions of a top electrode and a bottom electrode can also be larger than a core layer and can also expand into a side cladding layer.

Either a top electrode or a bottom electrode has been described as an electrode to which a voltage is to be applied in each of the exemplary embodiments. The exemplary embodiments apply directly to a lumped parameter line and a distributed parameter microstrip line. However, in the case of a distributed parameter grounded coplanar line, the descriptions of the top and bottom electrodes in each exemplary embodiment refer to the relation between a signal electrode and a ground electrode, the exemplary embodiments do not apply to vertically overlapping portions which are ground electrodes having the same potential.

This application is the National Phase of PCT/JP2008/071134. filed Nov. 20, 2008, which claims priority from Japanese Patent Application No. 2007-323330 filed on Dec. 14, 2007, the disclosure of which is incorporated herein in its entirety.

The invention claimed is:

1. A waveguide type optical device comprising:
a substrate;
a first electrode formed on the substrate;
a first cladding formed on the first electrode;
a first core formed on the first cladding;
a second core formed on the first core;
a second cladding formed on the second core;
a second electrode formed on the second cladding; and
a side cladding layer which covers a side surface of a core layer composed of the first core and the second core, wherein
a lateral width of one core from among the first core and the second core is satisfying a single mode condition for a waveguide, and a lateral width of the other remaining the first core or the second core is almost equal to or more than a width of a field distribution of light, whereas the other remaining the first core or the second core is not connected to a nearby core, and
a region where the first electrode and the second electrode vertically overlap each other is positioned over a region where the first core and the second core vertically overlap each other.

2. The waveguide type optical device according to claim 1, wherein a dielectric constant of the side cladding layer is lower than dielectric constants of the first cladding and the second cladding.

3. The waveguide type optical device according to claim 2, wherein dielectric constants of the first core and the second core are almost equal to the dielectric constants of the first cladding and the second cladding.

4. The waveguide type optical device according to claim 1, wherein the first core and the second core are each made of an electrooptic crystal material.

5. The waveguide type optical device according to claim 1 wherein the region where the first electrode and the second electrode vertically overlap each other is located almost at the same position as the region where the first core and the second core vertically overlap each other.

6. The waveguide type optical device according to claim 1 wherein widths of the first electrode and the second electrode are almost equal to the maximum lateral width in the core layer.

7. The waveguide type optical device according to claim 1, comprising a ring resonator with a waveguide including top and bottom electrode structures, input and output ports, and an optical coupler which couples the ring resonator and the input and output ports.

8. The waveguide type optical device according to claim 1, comprising two parallel waveguides which have one or two waveguides, in which one wave guide or two waveguides each including top and bottom electrode structures, optical couplers positioned at two ends of the two waveguides, and input and output ports positioned at ends of the optical couplers on a side opposite to the two waveguides.

9. The waveguide type optical device according to claim 1, wherein a lateral width of the other remaining the first core or the second core is almost equal to or less than twice the width of a field distribution of light.

* * * * *